United States Patent [19]
Ohmura et al.

[11] Patent Number: 6,127,933
[45] Date of Patent: *Oct. 3, 2000

[54] PORTABLE COMMUNICATION TERMINAL

[75] Inventors: Hiroshi Ohmura, Ishikawa; Susumu Otsuki; Mamoru Yoshida, both of Kanagawa, all of Japan

[73] Assignee: Matsushita Electric Industrial, Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/176,512

[22] Filed: Oct. 21, 1998

[30] Foreign Application Priority Data

Oct. 23, 1997 [JP] Japan ................................. 9-308134

[51] Int. Cl.$^7$ ............................................... G08B 21/00
[52] U.S. Cl. .......................... 340/636; 340/635; 455/566; 455/578; 455/90; 379/428; 379/433
[58] Field of Search ..................... 340/636, 635; 455/566, 575, 90; 379/428, 433

[56] References Cited

U.S. PATENT DOCUMENTS

D. 363,281  10/1995  Buurmann ............................. D14/138
5,185,789   2/1993   Hanon et al. ........................... 379/395
5,276,916   1/1994   Pawlish et al. ......................... 455/89
5,422,656   6/1995   Allard et al. ........................... 345/173
5,566,224   10/1996  ul Azam et al. ......................... 379/58
5,579,535   11/1996  Orlen .................................... 455/33.1
5,724,667   3/1998   Furuno .................................. 455/575
5,797,088   8/1998   Stamegna ............................... 455/345

FOREIGN PATENT DOCUMENTS 60-21636    of 0000  Japan .
8-186870    8/1996   Japan .
WO 82/03517 10/1982  WIPO .

*Primary Examiner*—Julie Lieu
*Attorney, Agent, or Firm*—Pearne & Gordon LLP

[57] ABSTRACT

Warning indication means of a warning LED lamp 22, etc., is disposed in the vicinity of a transmitter section 1 within a filed of view 13 of the user during conversation and if the battery remaining quantity falls below a specified value or antenna sensitivity is degraded, interfering with conversation, the warning indication means is blinked for warning the user without interfering with conversation during the conversation. The user becomes aware of the blinking warning indication means and recognizes a warning issued by a portable communication terminal 24. Based on the recognition, the user can also know more detailed warning contents by seeing an LCD section during the conversation.

24 Claims, 6 Drawing Sheets

PORTABLE COMMUNICATION TERMINAL

BACKGROUND OF THE INVENTION

This invention relates to a mobile communication terminal equipment and in particular to a portable communication terminal, such as a cordless telephone, a portable radio, a portable telephone, or a personal handy phone (PHS), that can warn the user of the battery remaining quantity, antenna sensitivity degradation, calling person identification, the communication time, etc., by indication means made up of LED lamps, etc.

For the current portable communication terminal to warn the user of the battery remaining quantity, antenna sensitivity degradation, etc., as display, generally a level is displayed on an LCD section of the portable communication terminal or a warning beep is sounded.

For example, in a first related art example shown in FIG. 10 (Japanese Patent Laid-Open No. Hei 8-186870), a portable communication terminal main body 61 is provided on the top with an out-of-service indication LED window 71 and a battery remaining indication LED window 72. Generally, the user is warned by displaying a level on a battery remaining level meter 58 or an antenna level meter 59 in an LCD section 53 or blinking an LED through the LED window 71 or 72 in a standby mode of the portable communication terminal or sounding a warning beep from a buzzer 56 during conversation. If the user puts the portable communication terminal of the first conventional example in an inside pocket of his or her clothes as shown in FIG. 11, incoming call indication means is not attached to a position allowing the user to see it in the pocket from the top when the terminal is called, thus the user cannot easily check the incoming call.

A second conventional example not shown (Japanese Patent Laid-Open No. Hei 7-99685) discloses a method of vibrating a vibrator with which a terminal is equipped during conversation, thereby warning the user, and producing a warning sound through a loudspeaker during a standby mode, thereby warning the user.

Further, a third conventional example not shown (Japanese Patent Laid-Open No. Sho 63-208093) discloses a method of making the user recognize the importance of a warning based on an LED lamp, wherein the LED lamp input voltage is changed, thereby changing the light emission degree of the lamp for the terminal user to monitor it.

However, it is during conversation that the user most wants to know the fact that the battery remaining quantity of his or her portable communication terminal falls below a specified value or that antenna sensitivity degradation interferes with conversation. In the LCD method shown in the conventional example, the terminal user brings the LCD section into intimate contact with his or her head during conversation and thus cannot check various warnings displayed on the LCD.

Likewise, in the terminal shown in the first conventional example shown in FIG. 10 (Japanese Patent Laid-Open No. Hei 8-186870), the user cannot check a warning because the LED and LCD section are in intimate contact with his or her head. In the method of sounding a warning beep, it is feared that the warning beep may go round by a transmitter section, disturbing conversation. The user may use the terminal with the warning beep function off during conversation; if a low-voltage warning beep is sounded during conversation, the user does not become aware of the warning until he or she goes out of the range and conversation goes off.

The second conventional example (Japanese Patent Laid-Open No. Hei 7-99685) discloses the method of driving a vibrator with which a terminal is equipped for warning the user as means for warning the user without hindering conversation during the conversation. However, in the method, it is feared that if the vibrator is driven when the battery is near to exhaustion, the vibrator will not be started or if started, the user will not become aware of vibration because of weak vibration. To start the vibrator, current is much consumed, promoting battery exhaustion. Further, current consumption of the vibrator causes the antenna sensitivity to be degraded during conversation.

The third conventional example (Japanese Patent Laid-Open No. Sho 63-208093) proposes means for informing the user of a terminal electronic device warning by changing the light emission color of the LED lamp; as a method of changing the light emission color of the LED lamp, the light emission degree is changed by changing the input voltage to the LED. However, the change in the light emission color of the LED lamp is not noticeable and the terminal electronic device user must always monitor the light emission change of the LED lamp; this is burdensome.

SUMMARY OF THE INVENTION

To solve the problems, the portable communication terminal according to the invention comprises warning indication means of a warning LED lamp, etc., in the periphery of a transmitter section of a case of the portable communication terminal, and blinks or turns on the warning indication means at a position within a field of view of the user during conversation, thereby warning the user of a state that the terminal function fluctuates and conversation becomes impossible due to the fact that the battery remaining quantity becomes low, the antenna sensitivity is degraded, etc., with low power consumption without a hitch during conversation.

To indicate different warnings, identify calling persons, and notify the conversation time, a plurality of LED lamps or an LED lamp capable of emitting different colors can be used to change the light emission color in accordance with the purpose for indicating the warning contents, etc.

DETAILED DESCRIPTION OF THE PREFERRED EMBODIMENTS

Referring now to the accompanying drawings, there are shown preferred embodiments of the invention.

First Embodiment

Figure 1:
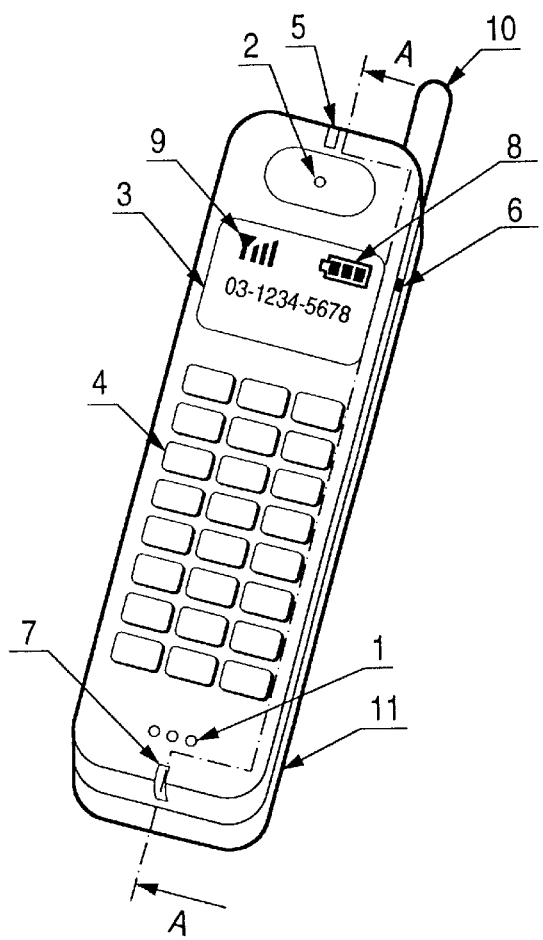
FIG. 1 is a perspective view to show the configuration of a portable mobile terminal according to first and third embodiments of the invention.

A portable communication terminal of a first embodiment of the invention will be discussed with reference to FIGS. 1 and 2. FIG. 1 shows a portable communication terminal of the first embodiment of the invention, which is shaped like a general portable communication terminal main body. The main body is provided with a transmitter section 1 and a receiver section 2 for conversation, an LCD section 3 for displaying a telephone number, an antenna level, or the battery remaining quantity, key switches 4 for pressing a telephone number, an incoming call LED lamp window 5, a buzzer 6 for producing a sound to notice the user of an incoming call and a warning, and a warning LED lamp window 7 for warning the user of a conversation state in the vicinity of the transmitter section 1. The transmitter section 1 includes a microphone and the receiver section 2 includes a speaker, as is conventional in the art.

Figure 2:
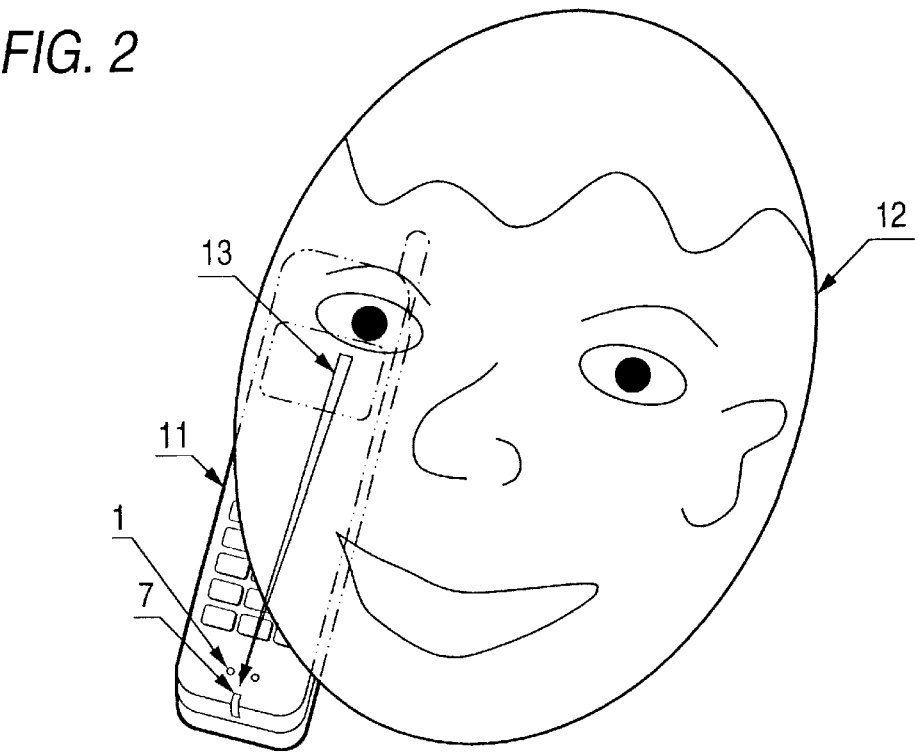
FIG. 2 is an illustration to show a use situation of the portable mobile terminal according to first to third embodiments of the invention.

FIG. 2 shows a conversation state of the portable communication terminal of the first embodiment. Although it is also considered that the incoming call lamp is placed at a lower position, it goes without saying on design that the incoming call LED lamp window 5 should be placed at an upper position of the terminal main body so that to use the portable communication terminal in a no sound calling mode, the user can enter the portable communication terminal in a breast pocket of his or her clothes and see the pocket from the top for easily checking that the incoming call lamp is on when the terminal is called. Thus, the incoming call lamp cannot be placed in the transmitter section of the portable communication terminal. If the incoming call lamp window is placed in the vicinity of the transmitter section in a lower part of the main body and the user puts the terminal in a breast pocket with the main body downward, it is feared that the tip of an external antenna may strike against the bottom of the pocket and perforate the breast pocket. Thus, placing the incoming call LED lamp in an upper part of the case is the best choice allowed on design. As shown in FIG. 2, usually the user presses the portable communication terminal against his or her head during conversation, thus during conversation the user cannot check a battery remaining level meter 8, an antenna level meter 9, etc., indicated on the LCD section 3 with the terminal in intimate contact with his or her head. If a sound not related to the conversation is produced from the buzzer 6, it is transmitted from a human head 12 to the receiver section 2 and the sound and the conversation interfere with each other.

From the consideration, in the first embodiment of the invention, the warning LED lamp window 7 is disposed in the vicinity of the transmitter section 1 of the portable communication terminal so that the talking user can catch the warning LED lamp blinking ahead his or her lip in a field of view 13. Therefore, the portable communication terminal has the advantage that it can make the user aware of a warning on the LED lamp blinking as warning indication without hindering conversation. During the standby mode, the indication can be changed for indicating change in the battery remaining capacity or antenna sensitivity in such a manner that warning indication means of the warning LED lamp, etc., is blinked intermittently at given time intervals, so that the battery remaining quantity or antenna level can be indicated without seeing the LCD section each time. Further, at the incoming call time, the light emission color or the indication pattern of blinking, etc., of the warning indication means of the warning LED lamp, etc., can be changed for indicating the battery remaining capacity or antenna level, so that the battery remaining capacity or antenna level can be indicated without seeing the LCD section each time.

The "vicinity of the transmitter section" is defined to specify the center periphery of the portable communication terminal main body because if a definition is made so as to include the case end face by the left and right of the transmitter section, the warning indication means of the warning LED lamp, etc., may be placed out of the field of view 13 under the condition that the user is a right or left hander, in which case the talking user cannot see the warning indication means.

If the user wants to know detailed warning contents, he or she needs to check the display contents of the LCD. In case of using a multi-color LED of three or four colors as the warning LED lamp, the warning level can be indicated in a different color, for example, green, orange, or red on one warning LED lamp, whereby the user can also check and distinguish the warning level according to dimly seen color difference without directly seeing the warning LED lamp placed out of user's eyes; this is an exceptional advantage of the portable communication terminal.

Second Embodiment

A portable communication terminal according to a second embodiment of the invention has the same shape as the portable communication terminal according to the first embodiment and is provided with a plurality of warning LED lamps to increase kinds of warnings.

Figure 3:
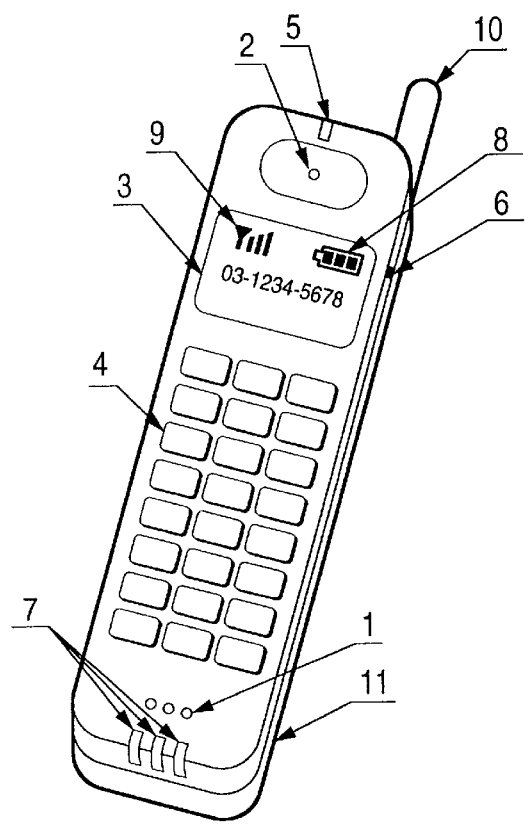
FIG. 3 is a perspective view to show the configuration of a portable mobile terminal according to a second embodiment of the invention.

FIG. 3 shows the configuration of the portable communication terminal according to the second embodiment of the invention. A portable communication terminal main body 11 of the portable communication terminal comprises a transmitter section 1 and a receiver section 2 for conversation, an LCD section 3 for displaying an antenna level or the battery remaining quantity, key switches 4 for pressing a telephone number, an incoming call LED lamp window 5, and a buzzer 6 for producing a sound to inform the user of an incoming call and sounding other warning beeps. It further includes a plurality of warning LED lamp windows 7 for warning the user of a situation interfering with conversation in the vicinity of the transmitter section 1. The operating warning LED lamps 7 can indicate different warnings by changing light emission colors of the operating LED chips or a blink indication pattern by an internal microprocessor (not shown). To install a plurality of warning LED lamps, one LED chip on which two or more LED lamps are mounted can be used instead of using plural LED chips to decrease the number of LED chips.

The number and colors of warning LED lamps are formed so as to correspond to those of traffic signal lights in such a manner that the three warning LED lamps shown in FIG. 3 are green, orange, and red from left to right, whereby the effect of making the user associate the warning meaning with the traffic signal light meaning is produced. A similar effect is also produced if two warning LED lamps, which are green and red, are formed so as to correspond to those of traffic signal lights for walkers.

Third Embodiment

The portable communication terminal according to the first embodiment is provided with a warning LED chip (not shown) and the warning LED window 7 separately, thus leading to an increase in costs. However, a portable communication terminal according to a third embodiment of the invention is adapted to eliminate the cost increase factor.

The portable communication terminal according to the third embodiment of the invention has an appearance similar to that of the portable communication terminal according to the first embodiment shown in FIG. 1.

Figure 4:
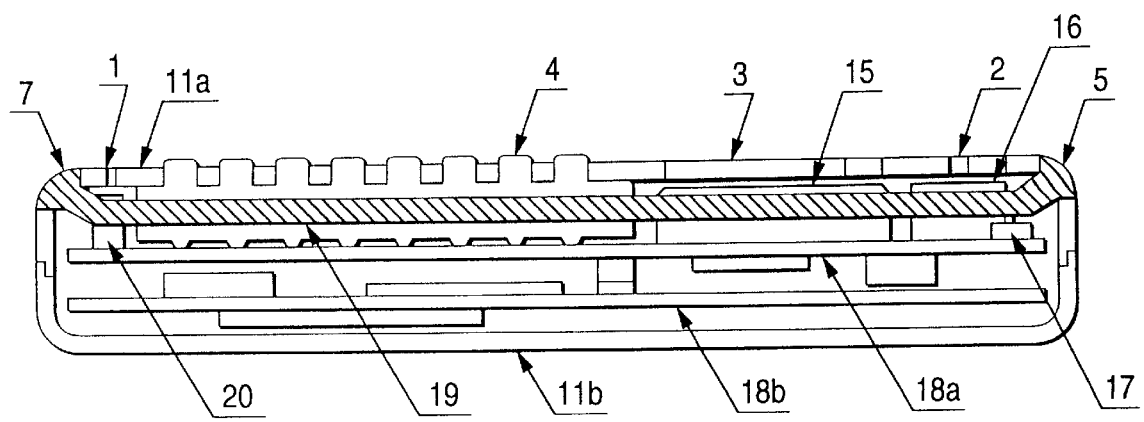
FIG. 4 is a sectional view taken on line A—A in FIG. 1 to describe a portable mobile terminal according to a third embodiment of the invention.

FIG. 4 is a sectional view taken on line A—A in FIG. 1 to describe the portable communication terminal according to the third embodiment of the invention; it shows the internal configuration of the portable communication terminal. An incoming call LED lamp window 5 and a warning LED lamp window 7 shown in FIG. 4 are formed of a single light conduction member 19 and are attached to the case of the portable communication terminal main body. The warning LED lamp window 7 is also turned on at the same time as an incoming call LED chip 17 emits light, so that the incoming call LED chip 17 is provided with a warning lamp function. During the standby mode, the indication state can be changed for indicating change in the battery remaining capacity or antenna sensitivity in such a manner that warning indication means of the warning LED, etc., is blinked intermittently at given time intervals, so that the battery remaining capacity or antenna level can be indicated without seeing an LCD section each time.

The incoming call lamp can be easily turned on to function as the warning lamp by designing the control of an internal microprocessor (not shown). Thus, the effect of forming the incoming call lamp and the warning lamp of the same member for decreasing the number of parts for avoiding an increase in costs is produced.

Fourth Embodiment

Figure 5:
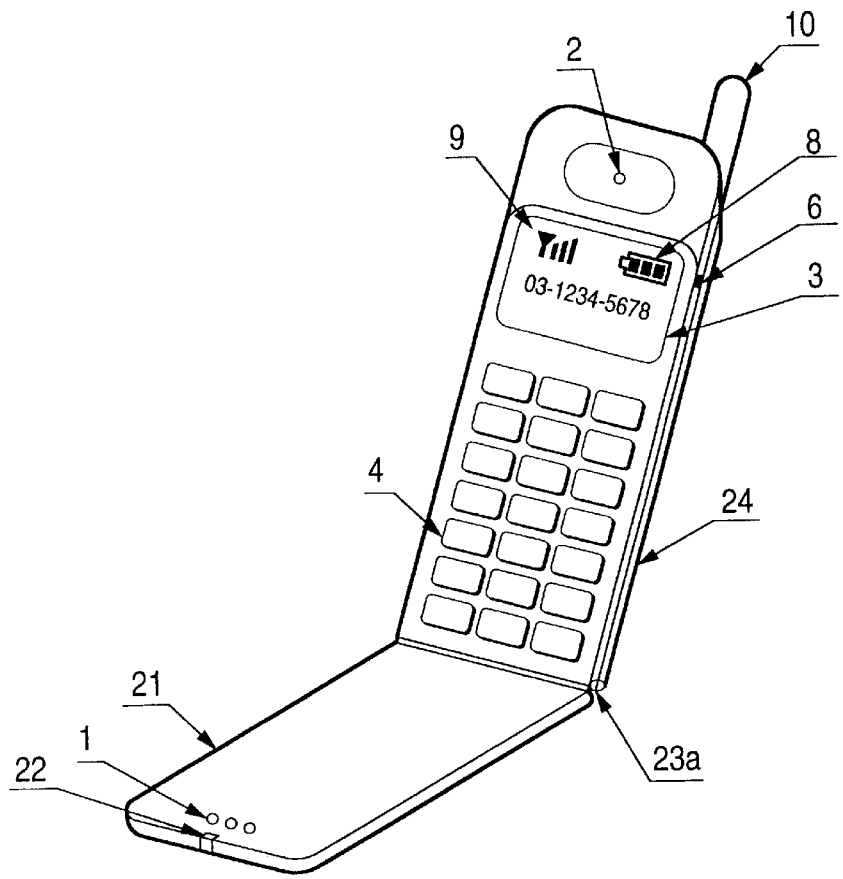
FIG. 5 is a perspective view to show the configuration of a portable mobile terminal according to a fourth embodiment of the invention.

A portable communication terminal according to a fourth embodiment of the invention comprises an incoming call LED lamp and a warning lamp in one piece. FIG. 5 shows the configuration of the portable communication terminal according to the fourth embodiment of the invention. The portable communication terminal comprises a case having a lid-like protective cover 21. A main body 24 of the portable communication terminal comprises a receiver section 2 for conversation, an LCD section 3 for displaying a telephone number, an antenna level, or the battery remaining quantity, key switches 4 for pressing a telephone number, a buzzer 6 for producing a sound to inform the user of an incoming call and sounding other warning beeps, the lid-like protective cover 21, a transmitter section 1 disposed therein, and an incoming call LED lamp window 22 placed in the vicinity of the transmitter section 1.

Figure 6:
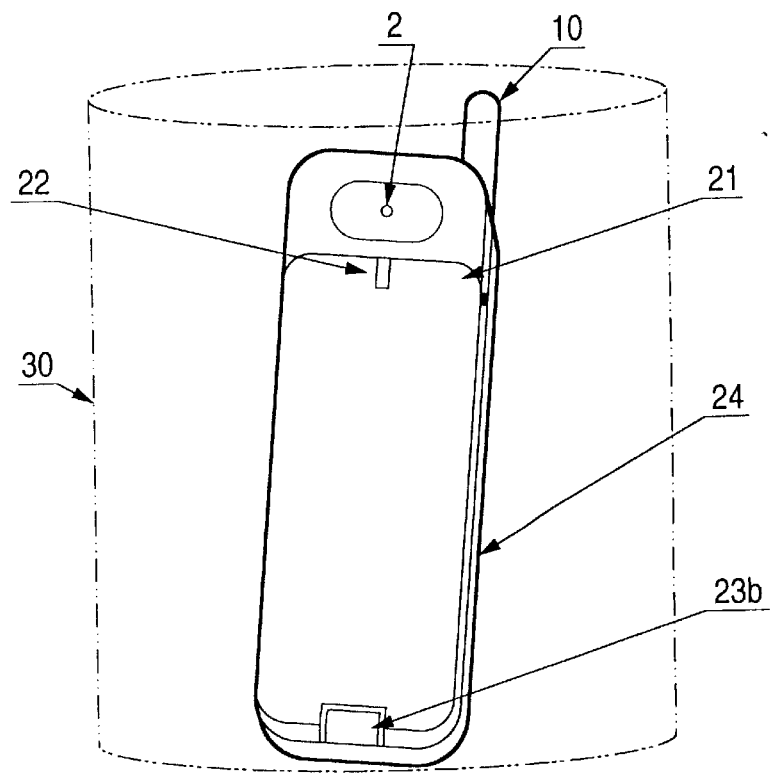
FIG. 6 is a perspective view of the portable mobile terminal according to the fourth embodiment when the portable mobile terminal is stored in a breast pocket.

FIG. 6 shows a state in which the portable communication terminal having the lid-like protective cover 21 is stored in a breast pocket with the lid-like protective cover 21 closed.

As seen from the described configuration, the portable communication terminal according to the fourth embodiment of the invention comprises the incoming call lamp and the warning lamp in one piece for simplifying the LED lamp configuration. As shown in FIG. 5, the LED lamp window 22 disposed in the vicinity of the transmitter section 1 of the portable communication terminal blinks during conversation so that the user can catch the LED lamp blinking ahead his or her lip in a field of view during conversation. The user, who becomes aware of the LED lamp blinking, can recognize a warning from the portable communication terminal without hindering the conversation. Thus, the incoming call lamp and the warning lamp are formed in one piece, whereby an exceptional advantage that the portable communication terminal can indicate a warning without an increase in costs is offered.

A multi-color LED of three or four colors is used as the warning LED lamp, whereby the warning level can be indicated in a different color, for example, green, orange, or red on the integrated warning LED lamp, so that the user can also check and distinguish the warning level according to dimly seen color difference without directly seeing the warning LED lamp placed out of user's eyes; this is an exceptional advantage of the portable communication terminal.

In the description, if more than one integrated warning lamp is provided, warnings can be increased, of course. At the time, to install more than one warning LED lamp, one LED chip on which two or more LED lamps are mounted can be used instead of using more than one LED chip to decrease the number of LED chips.

Fifth Embodiment

Figure 7:
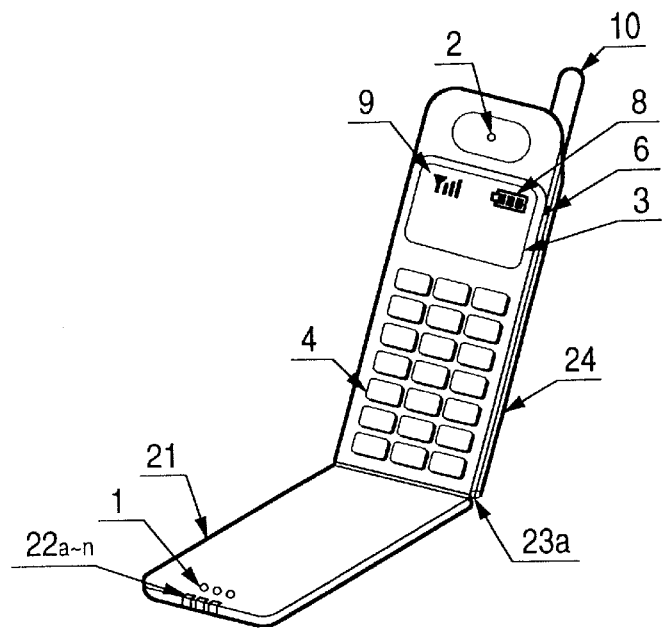
FIG. 7 is a perspective view to show the configuration of a portable mobile terminal according to fifth and six embodiments of the invention.
Figure 8:
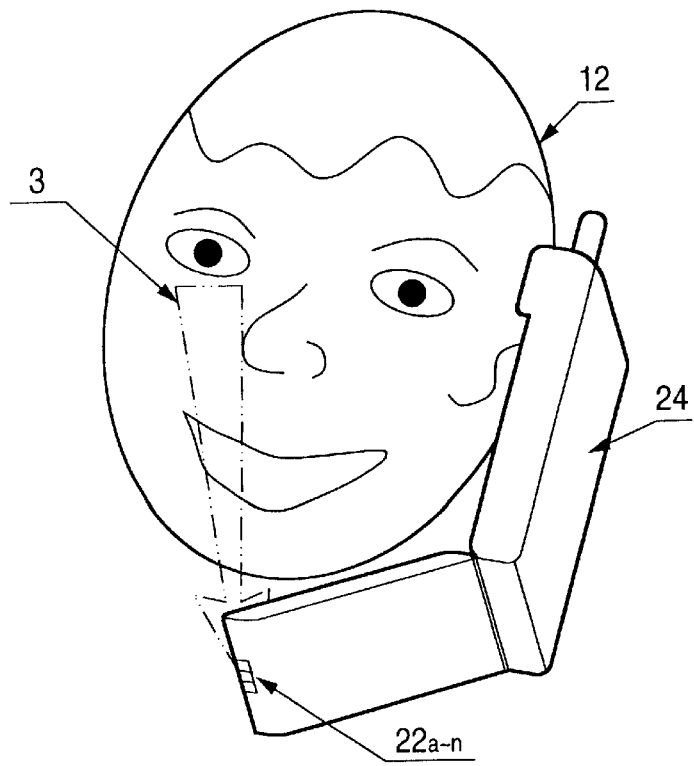
FIG. 8 is an illustration to show a use situation of the portable mobile terminal according to fifth and sixth embodiments of the invention.
Figure 9:
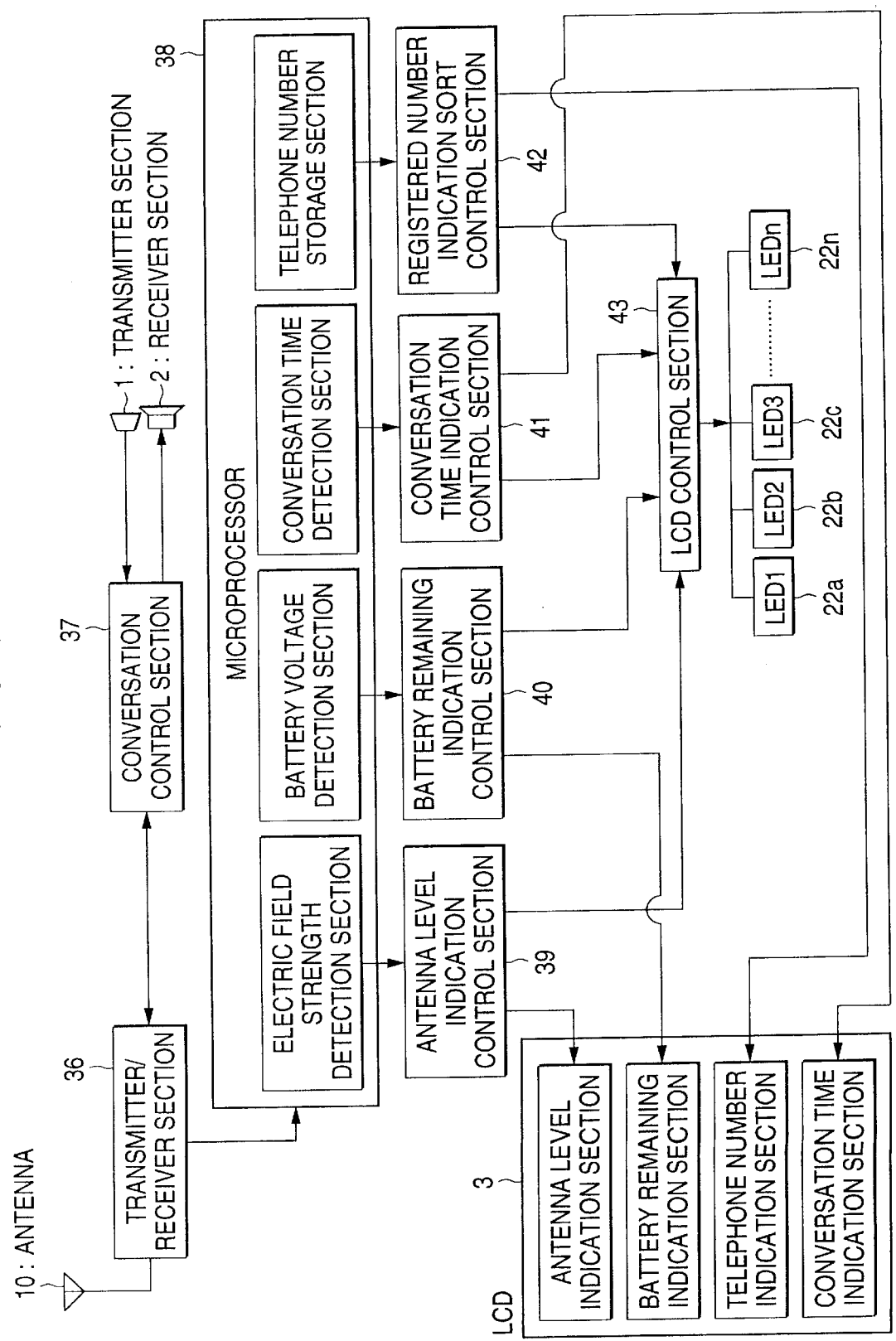
FIG. 9 is a block diagram to show a portable mobile terminal circuit configuration common to the embodiments of the invention.
Figure 10:
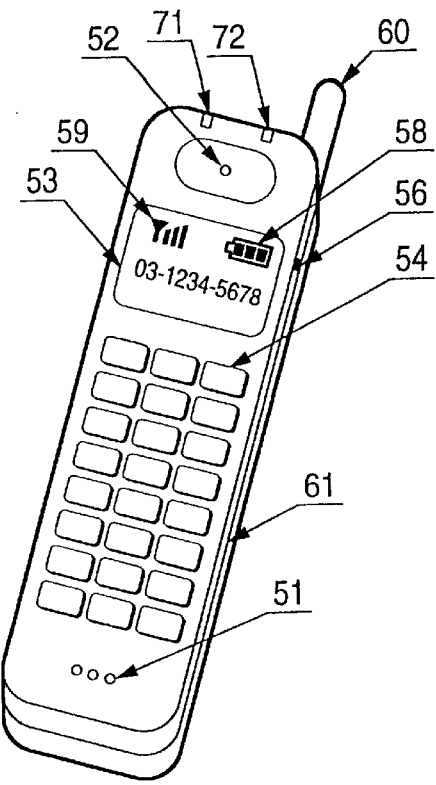
FIG. 10 is a perspective view to show the configuration of a portable mobile terminal according to a first conventional example.
Figure 11:
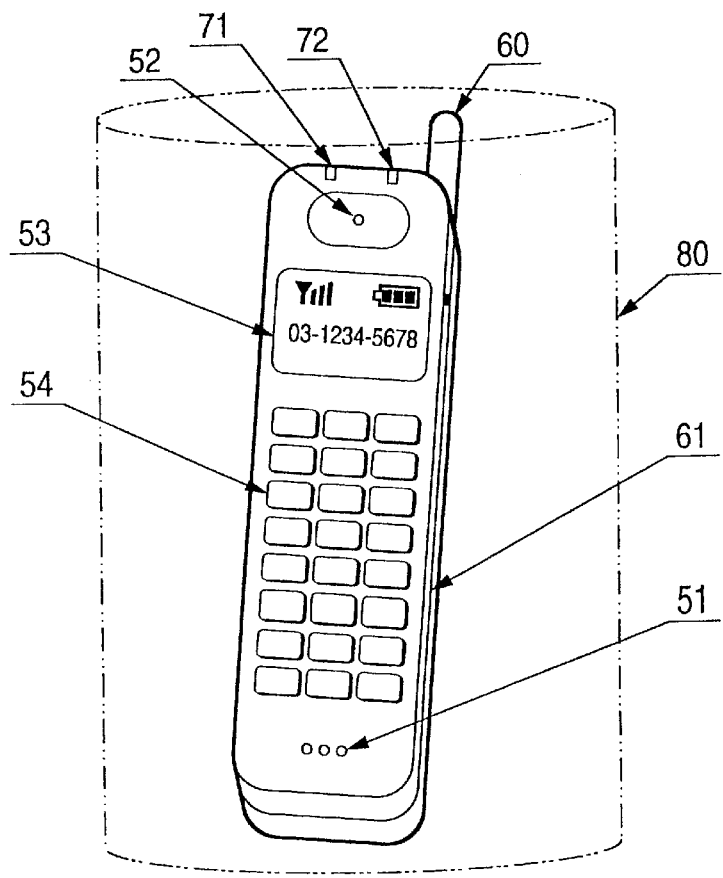
FIG. 11 is a perspective view of the portable mobile terminal according to the first conventional example when the portable mobile terminal is stored in a breast pocket.

FIG. 7 is a perspective view to show the configuration of a portable communication terminal according to a fifth embodiment of the invention. In the portable communication terminal according to the fifth embodiment, a plurality of LED windows 22 are disposed in the vicinity of a transmitter section 1 and are blinked for identifying a calling person. FIG. 8 is an illustration to show a use situation of the portable communication terminal according to the fifth embodiment. FIG. 9 is a block diagram to show a common circuit configuration to the portable communication terminals according to the embodiments of the invention.

To identify a calling person, a method of previously registering the telephone numbers of calling persons and setting singing melodies corresponding to the registered telephone numbers is available, but cannot be used in a state in which a singing melody is not allowed, for example, in a movie theater or during a meeting. Then, in the embodiment, to identify a calling person, the telephone numbers of calling persons are previously registered as in the above-mentioned method and a number of LEDs are blinked for changing a blink indication pattern or LED color conforming to the previously registered telephone number by an internal microprocessor 38, so that the user can identify the calling person. To install a plurality of LED lamps, one LED chip on which two or more LED lamps are mounted can be used instead of using plural LED chips to decrease the number of LED chips.

According to the embodiment, the user can identify the calling person based on LED lamp light emission color or blink indication pattern even in a state in which a singing melody is not allowed, for example, during a meeting or in a movie theater; the portable communication terminal has an exceptional advantage that it enables the user to identify the calling person without inconvenience to those around the user.

As shown in FIG. 7 and FIG. 8, the number and colors of LED lamps are formed so as to correspond to those of traffic signal lights in such a manner that the three LED lamps are green, orange, and red from left to right, so that the user can identify the calling person in such a manner that if the green LED lamp is on, it means a private call, if the orange LED lamp is on, it means a fairly important call, if the red LED lamp is on, it means a preferential call, whereby the effect of making the user associate the indication meaning with the traffic signal light meaning is produced. A similar effect is also produced if two indication LED lamps, which are green and red, are formed so as to correspond to those of traffic signal lights for walkers.

Sixth Embodiment

A portable communication terminal according to a sixth embodiment of the invention, which has the same configuration as the portable communication terminal according to the fifth embodiment, is provided with a plurality of LED lamps 22 and blinks the LED lamps for making the user recognize the conversation time.

To make the user recognize the conversation time, a method of indicating the conversation time on an LCD section for making the user recognize the conversation time is possible, but the user brings the LCD section of the portable communication terminal into intimate contact with his or her head during conversation and thus cannot see the LCD; the user cannot be made to recognize the conversation time during the conversation.

In the embodiment, to make the user recognize a lapse of time during conversation, an internal microprocessor 38 shown in FIG. 9 blinks or turns on a number of LED lamps every setup time and changes the blink or on indication pattern or LED lamp color for indicating a lapse of conversation time or the remaining time relative to the setup time. At the time, the number and colors of indication LED lamps are formed so as to correspond to those of traffic signal lights and, for example, the green, orange, and red LED lamps are turned on or blinked in order with the passage of time from the conversation start for making the user recognize the conversation time, whereby the effect of making the user associate the indicating meaning with the traffic signal light meaning is produced. A similar effect is also produced if two indication LED lamps, which are green and red, are formed so as to correspond to those of traffic signal lights for walkers. To install more than one LED lamp, one LED chip on which two or more LED lamps are mounted can be used instead of using more than one LED chip to decrease the number of LED chips. Thus, the portable communication terminal has the advantage that it enables the user to know the conversation time or terminate the conversation within his or her setup time, thereby suppressing unnecessary conversation time and saving telephone charges.

In the embodiments, examples of communication machines each having a microphone, such as a cordless telephone, a portable radio, a portable telephone, and a personal handy phone, have been described with reference to the accompanying drawings. With communication machines with no microphone, such as pagers, if a multi-color LED of three or four colors or different color LEDs are used as the warning indication means for producing warning indication in three colors of green, orange, and red and the color meanings are related to the indication meanings of traffic signal lights, a similar warning indication effect to that with the communication machine examples each having a microphone can be produced, needless to say.

As seen from the description made so far, according to the first embodiment, the portable communication terminal has the advantage that it can blink the LED lamp for indicating a warning to make the user aware of the warning without interfering with conversation. To use a multi-color LED of three or four colors as the warning LED lamp, the warning level can be indicated in a different color, for example, green, orange, or red on one warning LED lamp, whereby the user can also check the warning level according to dimly seen color difference without directly seeing the warning LED lamp placed out of user's eyes; this is an exceptional advantage of the portable communication terminal.

The portable communication terminal according to the second embodiment of the invention, which is provided with a plurality of warning LED lamps, has the advantage that it can increase warnings. The number and colors of warning LED lamps are formed so as to correspond to those of traffic signal lights in such a manner that a plurality of, for example, three warning LED lamps are green, orange, and red from left to right, whereby the advantage of making the user associate the warning meaning with the traffic signal light meaning is produced. A similar advantage is also offered if two warning LED lamps, which are green and red, are formed so as to correspond to those of traffic signal lights for walkers.

The portable communication terminal according to the third embodiment of the invention has the advantage that it can form the incoming call lamp and the warning lamp of the same member for decreasing the number of parts for avoiding an increase in costs.

The portable communication terminal according to the fourth embodiment of the invention, which is formed with the incoming call lamp and the warning lamp in one piece, has an exceptional advantage that it can indicate a warning without an increase in costs. A multi-color LED of three or four colors is used as the warning LED lamp, whereby the warning level can be indicated in a different color, for example, green, orange, or red on the integrated warning LED lamp, so that the user can also check the warning level according to dimly seen color difference without directly seeing the warning LED lamp placed out of user's eyes; this is another exceptional advantage of the portable communication terminal.

The portable communication terminal according to the fifth embodiment of the invention is provided with a plurality of LED windows in the vicinity of the transmitter section and can change an indication pattern of blinking, light emission colors, etc., for identifying a calling person. Thus, the user can identify the calling person based on LED lamp light emission color or blink indication pattern even in a state in which a singing melody is not allowed, for example, during a meeting or in a movie theater; the portable communication terminal has an exceptional advantage that it enables the user to identify the calling person without inconvenience to those around the user. The number and colors of indication LED lamps are formed so as to correspond to those of traffic signal lights in such a manner that a plurality of, for example, three indication LED lamps are green, orange, and red from left to right, whereby the advantage of making the user associate the indication meaning with the traffic signal light meaning is produced. A similar advantage is also offered if two indication LED lamps, which are green and red, are formed so as to correspond to those of traffic signal lights for walkers.

The portable communication terminal according to the sixth embodiment of the invention is provided with a plurality of LED windows and changes an indication pattern of blinking, light emission colors, etc., for making the user recognize the conversation time. Thus, the portable communication terminal has the advantage that it enables the user to know the conversation time or terminate the conversation within his or her setup time, thereby suppressing unnecessary conversation time and saving telephone charges. The number and colors of indication LED lamps are formed so as to correspond to those of traffic signal lights in such a manner that a plurality of, for example, three indication LED lamps are green, orange, and red from left to right, whereby the advantage of making the user associate the indication meaning with the traffic signal light meaning is produced. A similar advantage is also offered if two indication LED lamps, which are green and red, are formed so as to correspond to those of traffic signal lights for walkers.

What is claimed is:

1. A portable communication terminal comprising:
   a portable communication terminal main body including a transmitter section and a receiver section;
   warning indication means placed at a position within a field of view of a user during usage of the portable communication terminal in a conversation, said warning indication means being in the vicinity of said transmitter section and is used to provide warnings for both low battery status and antenna sensitivity degradation;
   wherein, if it is sensed during conversation that a battery remaining capacity falls below a specified value or an antenna sensitivity degradation interferes with conversation, an indication state of said warning indication means is changed to warn the user thereof, said warning indication means including an LED and the indication state of said warning indication means being changed by blinking said LED.

2. The portable communication terminal as claimed in claim 1, wherein during a standby mode, the indication state is intermittently changed at given time intervals to indicate change in the battery remaining capacity or antenna sensitivity.

3. The portable communication terminal as claimed in claim 1, wherein at incoming call time, an indication pattern of said warning indication means is changed to indicate the battery remaining capacity or antenna level.

4. The portable communication terminal as claimed in claim 1, wherein a multi-color indicating device is used for said warning indication means.

5. The portable communication terminal as claimed in claim 1, wherein a plurality of said warning indication means are provided and are operable to emit light in different light emission colors and
   an indication pattern of said warning indication means is changed by an internal microprocessor, so that different warnings are indicated.

6. The portable communication terminal as claimed in claim 5, wherein during a standby mode, the indication state is intermittently changed at given time intervals to indicate change in the battery remaining capacity or antenna sensitivity.

7. The portable communication terminal as claimed in claim 5, wherein a plurality of said warning indication means are provided, and a circuit element on which at least two warning indication means are mounted is used.

8. The portable communication terminal as claimed in claim 5, wherein the number and colors of the warning indication means are formed so as to correspond to those of traffic signal lights.

9. A portable communication terminal comprising:
   a portable communication terminal main body including a transmitter section and a receiver section;
   a warning indication means window placed at a position within a field of view of a user during usage of the portable communication terminal in a conversation, said warning indication means window being in the vicinity of said transmitter section, said warning indication means window and an incoming call indication means window being formed of a single light conduction member;
   wherein a warning is indicated in such a manner that an indication state of said warning indication means window is changed at the same time as an indication state of the incoming call indication means window.

10. The portable communication terminal as claimed in claim 9, wherein during a standby mode, the indication state is intermittently changed at given time intervals to indicate change in the battery remaining capacity or antenna sensitivity.

11. A portable communication terminal comprising:
    a portable communication terminal main body including a receiver section;
    a lid-like protective cover, said protective cover having an end that is rotationally secured to said terminal main body and comprising a transmitter section, said protective cover being movable between a closed position and an open position;
    indication means which is used as both an incoming call lamp and a warning lamp, said indication means being disposed on said lid-like protective cover in the vicinity of said transmitter section.

12. The portable communication terminal as claimed in claim 11, wherein said indication means is used as the incoming call lamp when the lid-like protective cover is in said closed position and is used as the warning lamp for warning a user of a battery remaining capacity or change in antenna sensitivity during conversation when the lid-like protective cover is in said open position wherein said indication means is within a field of view of the user.

13. The portable communication terminal as claimed in claim 12, wherein a warning is indicated by changing an indication state of said indication means by an internal microprocessor.

14. The portable communication terminal as claimed in claim 11, wherein a multi-color indicating device is used for said indication means.

15. The portable communication terminal as claimed in claim 14, wherein the number and colors of the warning indication means are formed so as to correspond to those of traffic signal lights.

16. The portable communication terminal as claimed in claim 11, wherein a plurality of indication means are provided.

17. The portable communication terminal as claimed in claim 16, wherein said indication means is used as the incoming call lamp when the lid-like protective cover is in said closed position and is used as the warning lamp for warning a user of a battery remaining capacity or change in antenna sensitivity during conversation when the lid-like protective cover is in said open position wherein said indication means is within a field of view of the user.

18. The portable communication terminal as claimed in claim 17, wherein different warnings are indicated by changing an indication pattern by an internal microprocessor.

19. The portable communication terminal as claimed in claim 16, wherein a circuit element on which at least two warning indication means are mounted is used.

20. The portable communication terminal as claimed in claim 16, wherein the number and colors of the warning lamps are formed so as to correspond to those of traffic signal lights.

21. A portable communication terminal comprising:

a portable communication terminal main body including a receiver section;

a plurality of indication windows placed at a position within a field of view of a user during usage of the portable communication terminal in a conversation, said plurality of indication windows being in the vicinity of said transmitter section;

wherein an information of a calling person is indicated by changing an indication pattern of said indication windows during conversation.

22. The portable communication terminal as claimed in claim 21, wherein the number and colors of said indication windows are formed so as to correspond to those of traffic signal lights.

23. A portable communication terminal comprising:

a portable communication terminal main body including a receiver section;

a plurality of indication windows placed at a position within a field of view of a user during usage of the portable communication terminal in a conversation, said plurality of indication windows being in the vicinity of said transmitter section;

wherein an information of conversation time is indicated by changing an indication pattern of said indication windows during conversation.

24. The portable communication terminal as claimed in claim 23, wherein the number and colors of said indication windows are formed so as to correspond to those of traffic signal lights.

* * * * *